United States Patent
Themelis (10) Patent No.: US 10,859,805 B2
(45) Date of Patent: Dec. 8, 2020

(54) ILLUMINATION SYSTEM, MICROSCOPE COMPRISING AN ILLUMINATION SYSTEM AND MICROSCOPE METHOD

(71) Applicant: Leica Instruments (Singapore) Pte. Ltd., Singapore (SG)

(72) Inventor: George Themelis, Lindau (DE)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 158 days.

(21) Appl. No.: 16/012,132

(22) Filed: Jun. 19, 2018

(65) Prior Publication Data

US 2019/0004303 A1     Jan. 3, 2019

(30) Foreign Application Priority Data

Jun. 30, 2017   (EP) .................................... 17179019

(51) Int. Cl.
    *G02B 21/06*  (2006.01)
    *G02B 21/16*  (2006.01)
    (Continued)

(52) U.S. Cl.
    CPC ......... *G02B 21/06* (2013.01); *G01N 21/6458* (2013.01); *G02B 5/208* (2013.01);
    (Continued)

(58) Field of Classification Search
    CPC .... G02B 21/06; G02B 21/0076; G02B 21/16; G02B 21/0032; G02B 27/58;
    (Continued)

(56) References Cited

U.S. PATENT DOCUMENTS

2012/0300294 A1  11/2012  Jess et al.
2015/0346098 A1  12/2015  Hauger et al.

FOREIGN PATENT DOCUMENTS

| JP | 2000097859 A | 4/2000 |
|---|---|---|
| JP | 2006003662 A | 1/2006 |
| WO | 2007/090591 A1 | 8/2007 |

*Primary Examiner* — Collin X Beatty
*Assistant Examiner* — Grant A Gagnon
(74) *Attorney, Agent, or Firm* — Hodgson Russ LLP (57) ABSTRACT

The invention relates to an illumination system (10) for a fluorescence microscope (3) for observation of an object (17) containing at least one fluorophore (19), to a microscope (1) and to a microscope method for illumination of an object (17) comprising at least one fluorophore (19). Solutions of the art have the disadvantage that orientation within an object (17) is difficult and visibility of fluorescing regions of the object (17) is non satisfying. The inventive illumination system (10) improves the visibility of an object (17) under study by comprising an illumination device (9), with an emission spectrum (22) which includes fluorescent excitation wavelengths (23) of the at least one fluorophore (19) and visible-light background wavelengths (25), further comprising a illumination filter (41) having at least one fluorescence excitation passband (93) and at least one background illumination passband (95), wherein the transmissivity (88)/width (92) of the fluorescence excitation passband (93) is larger/smaller than the transmissivity (88)/width (92) of the background illumination passband (95). The inventive illumination system (10) is adapted to perform the inventive microscope method.

14 Claims, 2 Drawing Sheets

(51) Int. Cl.
*G01N 21/64* (2006.01)
*G02B 5/20* (2006.01)
*G02B 21/36* (2006.01)
*G02B 21/00* (2006.01)
*G02B 26/02* (2006.01)

(52) U.S. Cl.
CPC ......... *G02B 21/0096* (2013.01); *G02B 21/16* (2013.01); *G02B 21/36* (2013.01); *G02B 26/02* (2013.01)

(58) Field of Classification Search
CPC .... G02B 21/365; G02B 21/367; G02B 21/26; G02B 21/10; G02B 21/008; G02B 21/14; G02B 21/0072; G02B 21/086; G02B 21/002; G02B 21/0024; G02B 21/361; G02B 21/0048; G02B 21/0088; G02B 21/0092; G02B 21/08; G02B 21/36; G02B 21/00; G02B 21/0004; G02B 21/0016; G02B 21/0044; G02B 21/0056; G02B 21/006; G02B 21/025; G02B 21/082; G02B 21/24; G02B 21/0012; G02B 21/0036; G02B 21/004; G02B 21/0064; G02B 21/02; G02B 21/084; G02B 21/088; G02B 21/18; G02B 21/22; G02B 21/32; G02B 21/34; G02B 2207/113; G02B 26/0833; G02B 27/0068; G02B 19/0028; G02B 21/0008; G02B 21/0068; G02B 21/125; G02B 21/248; G02B 21/362; G02B 2207/114; G02B 26/0816; G02B 27/1006; G02B 5/3083; G02B 7/14; G02B 13/0095; G02B 15/14; G02B 15/163; G02B 17/0896; G02B 19/0066; G02B 19/0076; G02B 19/008; G02B 19/0085; G02B 19/0095; G02B 1/02; G02B 21/0028; G02B 21/0096; G02B 21/12; G02B 21/241; G02B 21/33; G02B 21/364; G02B 23/2438; G02B 26/02; G02B 26/06; G02B 26/105; G02B 27/0025; G02B 27/0031; G02B 27/0075; G02B 27/0081; G02B 27/0911; G02B 27/0927; G02B 27/10; G02B 27/1013; G02B 27/106; G02B 27/126; G02B 27/141; G02B 27/145; G02B 27/283; G02B 27/30; G02B 27/425; G02B 27/4261; G02B 27/56; G02B 27/60; G02B 5/005; G02B 5/0278; G02B 5/04; G02B 5/09; G02B 5/1814; G02B 5/20; G02B 5/288; G02B 5/3016; G02B 6/06; G02B 6/065; G02B 6/4206; G02B 7/003; G02B 7/09; G02B 7/16; G02B 7/28; G01N 21/6458; G01N 21/648; G01N 21/65; G01N 21/64; G01N 2021/6419; G01N 2021/6421; G01N 2021/6463; G01N 2021/653; G01N 21/6486; G01N 2201/06113; G01N 1/02; G01N 2001/028; G01N 2021/392; G01N 2021/6417; G01N 2021/6471; G01N 2021/6478; G01N 21/00; G01N 21/01; G01N 21/39; G01N 21/4795; G01N 21/49; G01N 21/55; G01N 21/59; G01N 21/6447; G01N 21/645; G01N 21/6456; G01N 21/9501; G01N 2201/061; G01N 2201/0612; G01N 2201/0683; G01N 2201/10; G01N 2201/103; G01N 2201/105; G01N 2223/6116; G01N 2291/2697; G01N 2333/445; G01N 35/0099; G01N 35/10; G01N 3/42
USPC ........................................................ 359/385
See application file for complete search history.

ILLUMINATION SYSTEM, MICROSCOPE COMPRISING AN ILLUMINATION SYSTEM AND MICROSCOPE METHOD

CROSS REFERENCE TO RELATED APPLICATIONS

This application claims priority of European patent application number 17179019.9 filed Jun. 30, 2017, the entire disclosure of which is incorporated by reference herein.

FIELD OF THE INVENTION

The invention relates to an illumination system, a microscope and a microscope method.

BACKGROUND OF THE INVENTION

Illumination systems as for instance used in a fluorescence microscope or a fluorescence endoscope are applied for visual observation of fluorescence in clinical imaging. Typically bandpass filters are applied for illumination, excitation and for observation of a sample which comprises at least one fluorophore. Single passbands for illumination and observation as used in the art provide an increased contrast but have the disadvantage that the non-fluorescent issue appears black. Additionally, as single band filters are used, only application of a single fluorophore is possible, whereas the observation of two or more fluorophores requires the user to switch between filter sets.

SUMMARY OF THE INVENTION

An object of the present invention is therefore to provide an illumination system, a microscope and a microscope method that improves the quality of the images of the object.

The inventive illumination system for a fluorescence microscope for observation of an object containing at least one fluorophore solves the above problems by comprising an illumination device, the illumination device having an emission spectrum which comprises fluorescence excitation wavelengths of the at least one fluorophore and visible-light background illumination wavelengths which differ from the excitation wavelengths, by further comprising an illumination filter for arrangement between the illumination device and the object, the illumination filter having at least one fluorescence excitation passband which comprises at least the fluorescence excitation wavelengths and at least one background illumination passband which comprises the visible-light background illumination wavelengths, wherein the transmissivity of the fluorescence excitation passband is larger than the transmissivity of the background illumination passband and wherein the width of the fluorescence excitation passband is smaller than the width of the background illumination passband.

The inventive microscope solves the above problems by comprising an illumination system according to the invention.

The inventive microscope method for illumination of an object comprising at least one fluorophore solves the above problems by comprising the steps of illuminating the object with fluorescence excitation wavelengths in the fluorescence excitation spectrum of the at least one fluorophore and with visible-light background illumination wavelengths different from the fluorescence excitation wavelengths, wherein the visible-light background illumination wavelengths are attenuated before reaching the object.

The inventive illumination system, microscope and microscope method allow for simultaneous illumination of a sample with fluorescence excitation wavelengths and visible-light background illumination wavelengths, wherein the visible-light background illumination wavelengths are attenuated such that their intensity is on the same order of magnitude as the intensity of fluorescence emission wavelengths emanating from the fluorophore of the object.

The intensity of the visible-light background illumination wavelengths is therefore comparable with the intensity of fluorescence emission wavelengths. As a result, the fluorescing fluorophore and the tissue without the fluorophore—the tissue reflects the visible-light background illumination wavelengths—are observable at the same time.

The invention may be further improved by the following features, which may be combined independent of one another and wherein each feature has its own advantageous technical effect.

The illumination device of the illumination system may comprise a light source which may be embodied as a continuous light source, a discrete light source or may have an emission spectrum composed of a continuous emission pedestal and discrete wavelengths simultaneously emitted with the continuous pedestal.

A continuous light source is to be understood as a light source emitting light with a continuous spectrum, whereas a discrete light source has an emission spectrum with one or more discrete, isolated local maxima. The spectral power distribution of a discrete light source may drop to zero around or in between the local maxima.

The visible-light background illumination wavelengths may be emitted by the illumination device in a continuous or discrete manner and may in particular be perceived as white light. White light, being an additive color may be composed of a multitude of visible-light background illumination wavelengths, i.e. composed of a continuous spectrum, or composed of discrete single wavelengths. Exemplarily the visible-light background illumination wavelengths may comprise wavelengths perceived as red, green and blue. Similarly also cyan, magenta and yellow may result in the additive color white.

It is to be noted that colors are considered according to the perception of the human eye. If this disclosure combines the terms 'wavelength', 'emission' or 'absorption' with 'color x', it is to be understood as a 'wavelength (of emission/absorption) perceived in the human eye as color x'.

The transmissivity of the fluorescence excitation passband may be at least 0.7, preferentially at least 0.8 and more preferentially at least 0.9. In an ideal theoretical model the transmissivity of the fluorescence excitation passband is 1.0. Those theoretical values may not be obtained in a real filter, whereas the transmissivity of the fluorescence excitation passband of the illumination filter may be larger than 0.95 or even larger than 0.98. The transmissivity in general ranges from 0 (no transmission, opaque material) to 1 (transparent material, no losses) or from 1% to 100%.

The transmissivity of the background illumination passband is non-zero in real filters and may be on the order of $10^{-4}$ to $10^{-2}$. The transmissivity of the background illumination passband may also amount to several percent.

The efficiency of fluorescence processes is on the order of $10^{-3}$, such that the ratio of the transmissivity of the fluorescence excitation passband to the transmissivity of the background illumination passband is preferentially on the order of or larger than 1000. The attenuation of the background illumination wavelengths by means of the background illumination passband increases with decreasing efficiency of the fluorescence process.

The illumination filter may be embodied as a dielectric filter, wherein an optical density of 6 may be obtained for the background illumination passband. An optical density of 6 denotes a transmissivity of $10^{-6}$.

The illumination filter may be supported movable between different positions, wherein the illumination filter is preferentially tiltable. In each position of the illumination filter, the filter may have a different transmissivity of the background illumination passband. By a tilt of the illumination filter, it may be positioned such that the operation parameters differ from the specified working parameters based on which the filter has been designed.

A tilt of the illumination filter away from the specified working parameters, exemplarily the incidence angle of the electromagnetic radiation to be filtered, may thus decrease the optical density and increase the transmissivity of the background illumination passband and/or the transmissivity of the fluorescence excitation passband.

Depending on the number of dielectric layers of the illumination filter, the specific design of the filter and hence its quality, the optical density of the background illumination passband may also be on the order of 3-5.

The microscope method may be performed in a plurality of modes of operation, wherein in each of the plurality of modes of operation, the ratio of the energy in the visible-light background illumination wavelengths to the energy in the fluorescence excitation wavelengths is modified.

The illumination system therefore may comprise a selection device to select between the plurality of modes of operation selecting the corresponding ratio of the energy in the visible-light background illumination wavelengths to the energy in the fluorescence excitation wavelengths.

Furthermore, the microscope method may allow for changing the distribution of energy across the visible-light background illumination wavelengths. The illumination system according to the invention may perform this step of the method by comprising a plurality of modes of operation, wherein, in each of the plurality of modes of operation, the distribution of energy across the visible-light background illumination wavelengths is different.

This embodiment of the illumination system and the microscope method allow altering the composition of background illumination wavelength intensities which in turn results in an altered illumination color for illumination of the object. The illumination color may also be adapted to a reflectance characteristic of the object.

The different modes of operation which modify the ratio of the energy in the visible-light background illumination wavelengths to the energy in the fluorescence excitation wavelength, as well as the plurality of modes of operation changing the distribution of energy across the visible-light background illumination wavelengths may be chosen individually or in combination.

The inventive illumination system of a further embodiment comprises an illumination device with at least two light sources having different emission spectra. The microscope method applying this embodiment of the illumination system therefore illuminates the object simultaneously with at least two different emission spectra of the at least two light sources. Properties of the at least two light sources may be changed for the at least two light sources individually, such that different modes of operation of the plurality of modes of operation described above may be set.

In a further embodiment of the inventive illumination system the emission spectrum of one of the at least two light sources comprises the fluorescence excitation wavelengths and the emission spectrum of another one of the at least two light sources comprises the visible-light background illumination wavelengths.

The at least two light sources emit, in particular simultaneously, the fluorescence excitation spectrum for exciting fluorescence in the at least one fluorophore and the visible-light background illumination wavelengths that illuminate the object. Thus, portions of the object not showing fluorescence are also observable.

This embodiment of the illumination system has the advantage that the energy in the visible-light background illumination wavelengths and the energy in the fluorescence excitation wavelengths, as well as the ratio of said energies may be set by adjusting each of the at least two light sources individually.

Adjusting the light source comprising the visible-light background illumination wavelengths allow therefore to attenuate the visible-light background illumination wavelengths before they reach the object. The attenuation and optical density of the background illumination passband may therefore be decreased if the energy of the background illumination wavelengths is reduced. Adjusting the visible-light background illumination wavelengths does not influence the fluorescence excitation wavelengths.

The light source comprising the visible-light background illumination wavelengths may be a white-light light source emitting a continuous or discrete spectrum.

The perception of the emitted radiation of the white-light light source by a user or operator of the illuminate system, the microscope or microscope method may be a white additive color.

If, however, one out of the plurality of operation modes altering the distribution of energy across the visible-light background illumination wavelengths is chosen, a coloring of the background illumination may be generated.

The light source comprising the fluorescence excitation wavelengths may be embodied as a narrowband light source, wherein the term narrowband light source is to be understood as a light source with an emission spectrum having a bandwidth of few, several or up to 10 or 20 nanometers. Narrowband light sources are well known in the field of light emitting diodes (LED) or lasers, wherein in the range of visible light wavelengths, a light source with a bandwidth of few nanometers is considered narrowband.

LEDs do in general represent discrete-light light sources, whereas a laser may either comprise a discrete or a continuous emission spectrum.

The emission spectra of the at least two light sources for the visible-light background illumination wavelengths and for the fluorescence excitation wavelengths may be spectrally separated, such that they do not overlap.

The inventive microscope method may illuminate an object comprising different fluorophores with different fluorescence excitation wavelengths. The inventive illumination system provides said different fluorescence excitation wavelengths by comprising different light sources.

The different light sources emitting different fluorescence excitation wavelengths may be in particular embodied as narrowband light sources emitting at a center wavelength that corresponds to a respective excitation maximum of the fluorescence excitation spectrum of the fluorophore.

The emission of the at least two light sources may be combined by means of a light combination device. The light combination device may be embodied as a bifurcated fiber, a prism arrangement, a beam combiner or a dichroic mirror. Combination of light emitted by the at least two light sources may also be performed by a superposition of the individual light emission directions under an angle of a few degree.

In a further embodiment of the inventive microscope method the distribution of energy across the visible-light background illumination wavelengths is automatically adjusted depending on the fluorescence emission spectrum of the at least one fluorophore.

Furthermore, the method may automatically adjust the intensity in the visible-light background illumination wavelengths depending on the intensity of the light emitted in the fluorescence emission spectrum of the at least one fluorophore. Adjusting the distribution of energy across and the intensity of the visible-light background illumination wavelengths may be performed alternatively or in combination.

The inventive illumination system adapted to perform the above embodiment of the inventive microscope method comprises a controller which is configured to adapt at least one of the emission spectrum and the intensity of the at least two light sources independently of one another.

The above embodiments have the advantage, that a white-light background illumination outshining the fluorescence of the at least one fluorophore of the object may be adjusted (reduced) in its intensity to equal the intensities of the background illumination and the fluorescence emission.

The inventive illumination system according to another embodiment comprises an intensity of visible-light background illumination wavelengths which has at least one local maximum at a color being complementary to the color of the fluorescence emission. In the microscope method, the distribution of energy across the visible-light background illumination wavelengths is adjusted such that a local maximum is obtained. The wavelength of said maximum corresponds to a color which is in particular complementary to the color of the fluorescence emission.

This embodiment has the advantage that the visibility of the fluorescence may be increased. If, exemplarily, an orange (red) fluorescence is present in the object, the intensity of visible-light background illumination wavelengths has preferentially a local maximum at a wavelength corresponding to a blue (green) color.

To adapt the distribution of energy across the visible-light background illumination wavelengths, the inventive illumination system comprises an image processor and a light source controller, wherein the image processor is configured to determine a color of at least part of the object and wherein the light source controller is adapted to change the emission spectrum of the light source depending on the determined color.

The microscope method applying this embodiment of the illumination system therefore determines the color of at least part of the object, transfers a color information signal corresponding to the determined color to the controller, calculates or determines the color being complementary to the determined color and provides a corresponding light adaption signal to the light source controller which changes the emission spectrum of the light source comprising the visible-light background illumination wavelengths in accordance with the light adaption signal.

If the image processor, as an example, detects fluorescence in the red part of the visible spectrum, i.e. at a wavelength around 650 nm, the controller provides the color information signal via a color signal line to the light source controller.

The color information signal may be received by a control module of the light source controller, which provides a light adaption signal to the light source which changes its mode of operation and emits light with a color complementary to the detected red light of the fluorescence, i.e. green light.

The spectrum of the background illumination light source of this example thus comprises a local maximum at a wavelength or at wavelengths in the green part of the visible spectrum, i.e. at wavelengths around 550 nm.

In order to determine the color of at least part of the object, the illumination system may comprise a camera, wherein the image processor may be adapted to determine the object color depending on image data provided by the camera.

The image processor may also be configured to determine a color of at least one region of the object, wherein a color excluding the emission wavelengths of the at least one fluorophore may be detected.

Therefore, the color of the light source providing the background illumination may be adapted by the light source controller according to the spectral characteristics of the object or according to the color of the fluorescence emission. The image processor and/or the light source controller may be embodied as a software, as a hardware or as a combination of software and hardware.

The microscope method may furthermore not only adapt the color of the background illumination wavelengths to the color of the fluorescence emission or to the color of the object, but may also automatically adjust the intensity in the visible-light background illumination wavelengths depending on the intensity of light emitted in the fluorescence emission spectrum of the at least one fluorophore.

This step of the method is performed by an embodiment of the illumination system which comprises an intensity detector for determining an intensity of fluorescence light emitted from the at least one fluorophore. The intensity determined by the intensity detector is used to automatically adjust the intensity in at least part of the visible-light background illumination wavelengths in dependence of the determined intensity.

A multispectral camera and image processor may be provided in the illumination system to adapt the intensity and/or distribution of the visible-light background illumination wavelengths based on a single capture of the object.

The method may therefore adapt the distribution of energy across the visible-light background illumination wavelengths in dependence on the fluorescence emission spectrum or the color of parts of the object and may adapt the intensity in the visible-light background illumination wavelengths depending on the intensity of light emitted in the fluorescence emission spectrum.

The adaption of the at least one light source to the illumination and/or fluorescence conditions, comprising intensity and/or color, may in particular be performed automatically. The adaption may furthermore be performed in an open or closed control loop and may adapt said conditions instantaneously after a modified illumination or fluorescence intensity or color has been determined or detected.

The illumination system as well as the microscope method described above may be incorporated into or performed with a microscope or endoscope, in particular a fluorescence microscope or endoscope.

Furthermore, the illumination system may be embodied as an upgrade kit which is adapted to be incorporated into microscopes of the art.

The upgrade kit may be embodied with or without the illumination device.

For receiving the illumination filter, a present infrastructure of the microscope of the art may be applied, such that no further adaption of the microscope of the art is necessary, the implementation of the inventive illumination system is easy and allows performing the inventive microscope method with a microscope of the art if said microscope comprises an inventive upgrade kit.

It is furthermore noted that a microscope of the art as well as an inventive microscope comprises an observation filter that blocks the fluorescence excitation wavelengths.

Additionally it is conceivable that the visible-light background illumination wavelengths located spectrally outside of the fluorescence excitation passband are superimposed with a portion of the fluorescence excitation wavelengths reflected by the object and transmitted through the observation filter. The observation filter therefore may have a non-zero transmissivity for the fluorescence excitation wavelengths.

Exemplarily, if excitation of the fluorophore applies wavelengths corresponding to a blue color, the background illumination wavelengths located spectrally outside of the fluorescence excitation passband may comprise a discrete light source (e.g. a LED) in the green spectral region and one discrete light source in the red spectral region.

Only the superposition of a portion of the fluorescence excitation wavelengths transmitted through the observation filter with said two background illumination wavelengths results in the additive white-light.

In a further embodiment of the microscope method the emission of fluorescence excitation wavelengths and/or the emission of visible-light background illumination wavelengths may be temporally modulated. For doing so the inventive illumination system may comprise a frequency generator module that provides a modulation signal via a modulation control line to at least one light source for temporal modulation of the emission of the fluorescence excitation wavelengths and/or the visible-light background illumination wavelengths. Said frequency generator module may be integrated into the light source controller and may be selected or deselected by the user or operator. Furthermore, it is possible that a plurality of modes of operation having different modulation frequencies for the modulation of background illumination or fluorescence excitation is selectable. User control of this plurality of modes of operation may be realized by operation mode switches.

The described modulation has the advantage that visibility is enhanced as for instance a flashing of the fluorescence emission allows for easier detection of these low intensity signals. The enhancement of visibility is related to human cognition, in particular to motion perception.

Embodiments of the invention are explained in greater detail below by way of example using the accompanying figures. The embodiments and graphs shown represent possible configuration of the invention. In the description of the embodiments the same features and elements having the same technical effect are provided with the same reference numerals.

DETAILED DESCRIPTION OF THE INVENTION

Figure 1:
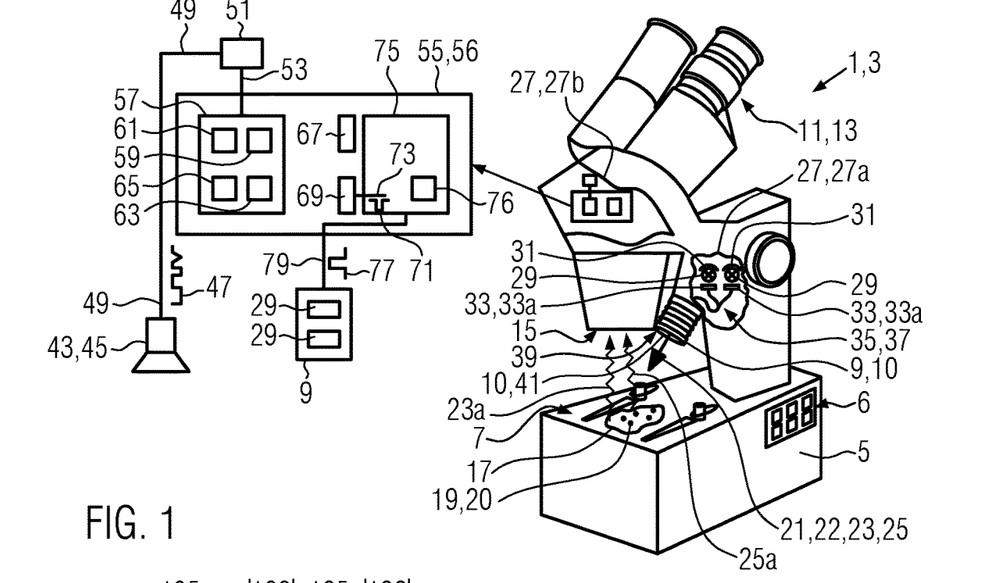
FIG. 1 shows a schematic drawing of a microscope.

FIG. 1 shows a schematic illustration of an inventive microscope 1 which is embodies as a fluorescence microscope 3 comprising a body 5, an observation area 7, an illumination device 9 and an observation assembly 11 which is embodied as a stereoscopic eyepiece 13 in the embodiment of the fluorescence microscope 3 shown in FIG. 1.

The observation assembly 11 also comprises observation optics 15 which may be embodied as microscope objectives (not shown) as known in the art.

Within the observation areas 7 an object 17 which comprises at least one fluorophore 19 is located. The illumination device 9 emits light 21 onto the object 17, wherein the light 21 has an emission spectrum 22 which includes fluorescence excitation wavelengths 23 and visible-light background illumination wavelengths 25. The light 21, the fluorescence excitation wavelengths 23 and the visible-light background illumination wavelengths are indicated by an arrow. The fluorescence excitation wavelengths (23) are comprised in a fluorescence excitation spectrum 20 of the fluorophore 19.

The fluorescence microscope 3 of FIG. 1 shows 2 partial cut outs 27 that schematically show further elements of the fluorescence microscope 3.

A first partial cut-out 27a shows two light sources 29 that emit light 21 which is collected by a collector 31 and collinated by an optical element 33 which may be embodied as an optical lens 33.

The optical lens 33a couples the light 21 into a light combination device 35 which is embodied as a bifurcated optical fiber 37 in FIG. 1.

The light 21 that is coupled into the bifurcated optical fiber 37 is guided within the fiber through the illumination optics 39, where an illumination filter 41 is comprised. The illumination filter 41 may also be arranged in a free beam path (not shown) between two optical fibers within the fluorescence microscope 3.

The light 21 emanating from the illumination device 9 is incident on the object 17 wherein the fluorescence excitation wavelengths 23 excite the fluorophores 19 of the object 17 and wherein the visible-light background illumination wavelengths 25 illuminate the object 17.

From the object 17 reflected visible-light background illumination 25a and fluorescence emission wavelengths 23a (both indicated by a waved arrow), emanate from the object 17 and are collected by the observation optics 15 and visible for a user or operator through the observation assembly 11.

The elements present in the second partial cut-out 27b are shown in an enlarged view left of the fluorescence microscope 3.

The light 21 collected by the observation optics 15 is also detected by a detector 43 which is embodied as a camera 45 in FIG. 1. An image signal 47 is transmitted via an image single line 49 to a camera driver 51 and subsequently via a second image signal line 53 to a circuit board 55 which comprises further electric components. The circuit board 55 may be understood as a controller 56 or may form part of the controller 56.

The image signal 47 is transmitted to an image processor 57 which comprises a fluorescence emission color identification module 59 which is adapted to identify a color 112

(not shown) of the fluorescence emission. The fluorescence emission color identification module 59 allows for determination of the wavelength value of the fluorescence emission wavelengths 23*a*.

The image processor further comprises a fluorescence emission intensity detection module 61 which is adapted to determine the intensity of the fluorescence.

Similarly, the image processor 57 comprises a background color identification module 63 and a background intensity detector module 65.

The image processor 57 therefore analyzes the image signal 47, wherein further modules located on the circuit board 55, as for instance a comparator module 67 or a memory module 69 may be embodied on the circuit board.

The image processor 57 provides an image evaluation signal 71 via an image evaluation line 73 to a light source controller 75. The image evaluation signal 71 is a representation of the determined intensity and color 112 (not shown) of the fluorescence emission as well as of the background.

The image evaluation signal 71 may comprise a color information signal (not shown) and an intensity information signal (not shown) for both the fluorescence emission and the background. The light source control signal 77 may comprise a light intensity adaption signal (not shown) for adapting the intensity of the background illumination wavelength 25 and a light color adaption signal (not shown) for modification of the additive color of the visible-light background illumination wavelengths 25.

The light source controller 75 furthermore comprises a frequency generator module 76 which may be activated and controlled by operation mode switches 6. The operation mode switches 6 may be embodied as push-buttons (no reference numeral) or as rotary knobs (no reference numeral) and may be used to control a temporal modulation of the fluorescence and/or background illumination, to control the adaption to the fluorescence and/or background illumination intensities and to control the adaption to the fluorescence and/or background illumination color.

According to the image evaluation signal 71 the light source controller 75 provides a light source control signal 77 via a light source control line 79 to the illumination device 9. The illumination device 9 is only schematically shown in the enlarged view of FIG. 1.

As described above, the illumination device comprises one or more (in the embodiment shown in FIG. 1 two) light sources 29 which are driven and controlled by the light source controller 75.

The fluorescence microscope 3 may comprise operation mode switches 6 by means of which the energy in the visible-light background illumination wavelengths 25 or the distribution of energy across the visible-light background illumination wavelengths 25 may be controlled and adapted by the light source controller 75.

Figure 2:
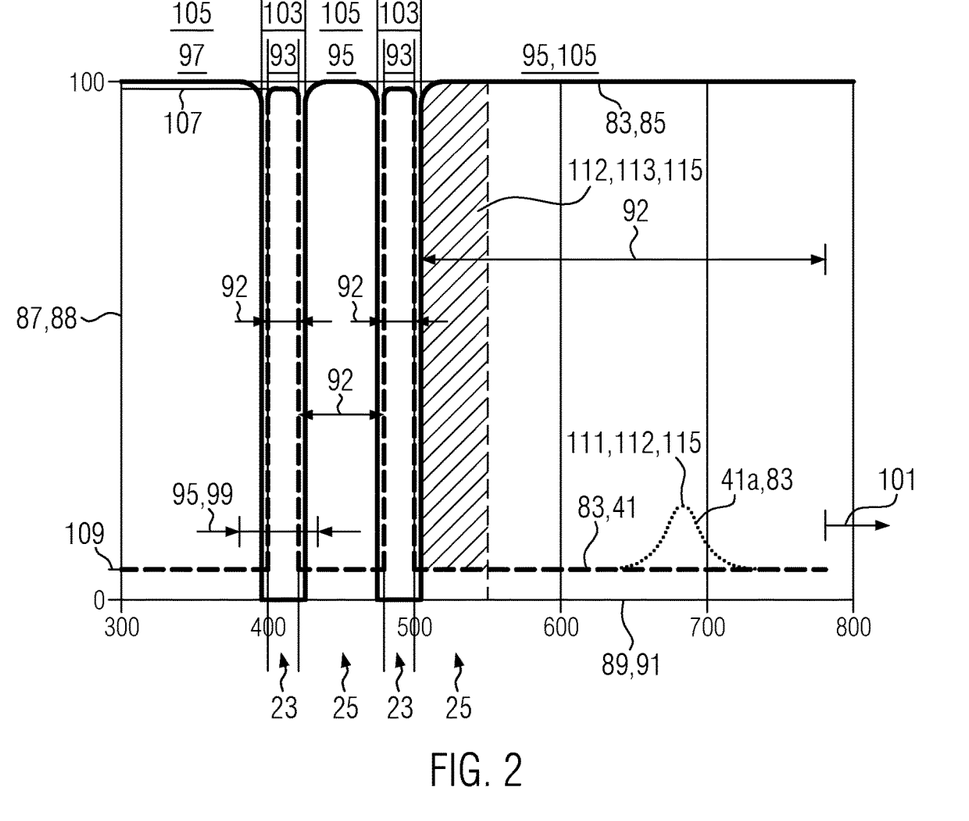
FIG. 2 shows a transmission characteristic of the inventive illumination system in a first embodiment.

FIG. 2 shows a transmission characteristic 83 of the illumination filter 41 and a transmission characteristic 83 of an observation filter 85.

The transmission characteristics 83 show a transmissivity 88 given in units of percentage, such that the transmissivity 88 ranges from 0% to 100%. The transmissivity 88 is given at an axis of ordinates 87 which is plotted versus wavelength 91 given on an axis of abscissa. The wavelength 91 of the axis of abscissa 89 is given in nanometers, wherein a range of the axis of abscissa encompasses the wavelength range between 300 nm and 800 nm.

The transmission characteristic 83 of the illumination filter 41 comprises two fluorescence excitation passbands 93 and two background illumination passbands 95. The four passbands 93, 95 are indicated above the plot of FIG. 2. Each of the fluorescence excitation passbands 93 and the background illumination passbands 95 have a width 92, wherein the width 92 of the fluorescence excitation passbands 93 is smaller than the width 92 of the background illumination passbands 95.

At wavelengths 91 shorter than the fluorescence excitation wavelengths 23 the illumination filter 41 comprises a UV-band 97 which may also be considered as a background illumination passband 95 if at least one light source 29 of the fluorescence microscope 3 (see FIG. 1) has an emission spectrum that comprises visible-light background illumination wavelengths 25 in the violet spectral region 99 that extends approximately between 380 nm and 430 nm.

The two background illumination passbands 95 of FIG. 2, however, comprise visible-light background illumination wavelengths 25 and may extend into the near infrared spectral region 101 which comprises electromagnetic radiation of wavelengths 91 above 780 nm.

The fluorescence excitation passbands 93 of the illumination filter 41 are located within block bands 103 of the observation filter 85 wherein the observation filter 85 further comprises observation passbands 105 next to and in between the block bands 103.

FIG. 2 shows that the transmission characteristic 83 of the illumination filter 41 has a fluorescence excitation passband transmissivity 107 which amounts to approximately 98%.

Within the background illumination passbands 95 the transmission characteristic 83 of the illumination filter has a background illumination passband transmissivity 109 which amounts to approximately 6% for the illumination filer 41 of FIG. 2.

The transmissivity 88 of the observation filter 85 shown in FIG. 2 represents an ideal observation filter 85 with a transmissivity of 0% within the block bands 103 and a 100% transmissivity 88 within the observation passbands 105. The observation block bands 103 completely encompass the fluorescence excitation passband 93 of the illumination filter 41.

FIG. 2 furthermore shows a transmission characteristic 83 of a second illumination filter 41*a* which is indicated by a dotted line which is only shown in a spectral region in which the illumination filter 41 differs from the second illumination filter 41*a*.

The transmission characteristic 83 of the second illumination filter 41*a* shows a local maximum 111 which is centered at a wavelength 91 of approximately 680 nm. The transmission characteristic 83 of the second illumination filter 41*a* results in a red or reddish appearance of a superposition of the visible-light background illumination wavelengths 25. Such a reddish color 112 is advantageous for increasing a contrast (not shown) if a fluorescence emission 113 is located within a spectral region corresponding to a green color 112 as shown in FIG. 2. Here, the fluorescence emission 113 is indicated by a shading and centered at approximately 525 nm.

Consequently the color 112 of the superposition of visible-light background illumination wavelengths 25 of light transmitted through the second illumination filter 41*a* is complementary to the color 112 of the fluorescence emission 113.

Figure 4:
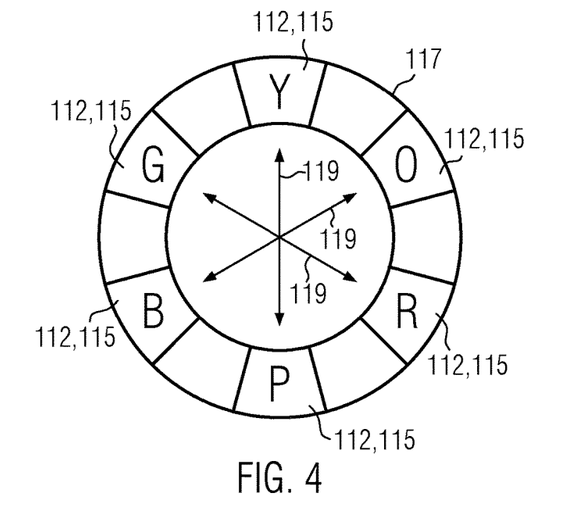
FIG. 4 shows a color wheel for the explanation of complementary colors.

The principle of complementary color 115 is further described in FIG. 4.

Figure 3A:
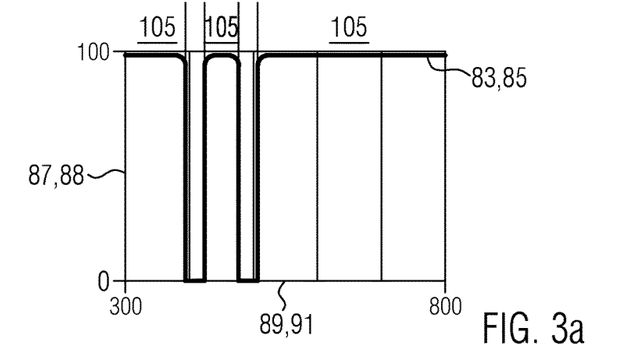
FIGS. 3a-3c show transmission characteristics of a second embodiment of the inventive illumination system.

FIG. 3 shows 3 different transmission characteristics 83, wherein FIG. 3*a* shows the transmission characteristic 83 of the observation filter 85 which is different to the observation filter 85 shown in FIG. 2 in that the transmissivity 88 in the observation passbands 105 of the observation filter 85 shown amounts to approximately 98%.

Figure 3B:
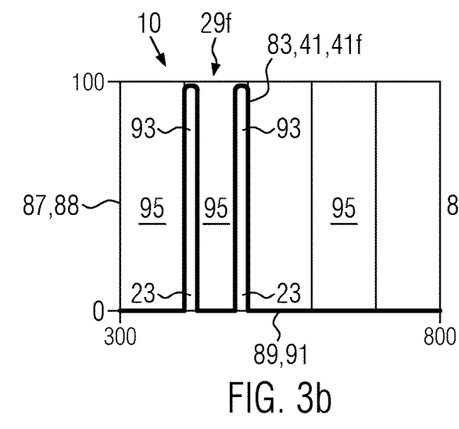
Figure 3C:
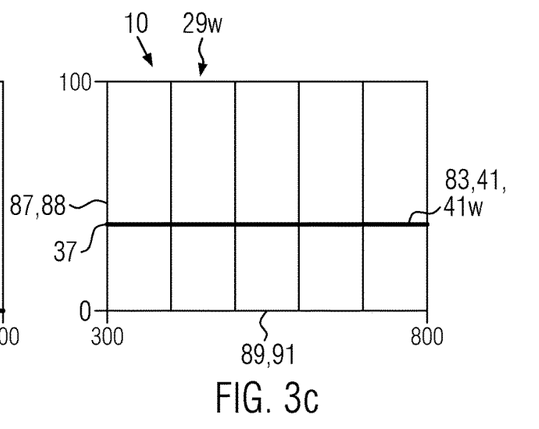

The illumination system 10 represented by the three transmission characteristics 83 of FIGS. 3a-3c comprises two illumination filters 41, wherein the transmission characteristics 83 shown in FIG. 3b is obtained for a fluorescence filter 41f and the transmission characteristics 83 shown in FIG. 3c is obtained with a white-light filter 41w. The fluorescence filter 41f of FIG. 3b is located within the beam path of a fluorescence excitation light source 29. The transmission characteristic 83 of the fluorescence filter 41f comprises fluorescence excitation passbands 93 similar to illumination filter 41 described by means of its transmission characteristic 83 in FIG. 2.

The background illumination passbands 95 of the fluorescence filter 41f, however, do show a transmissivity 88 of approximately 0%. The fluorescence excitation light source 29f is affected solely in its fluorescence excitation wavelengths 23 which are not affected by the background illumination passbands 95.

The white-light filter 41w shown in FIG. 3c is located within the beam path of a white-light source 29w.

The transmission characteristics 83 of the white-light filter 41w shows a flat progression and a substantially constant transmissivity 88 that amounts to approximately 37%.

The white-light filter 41w therefore does not distinguish different bands as the fluorescence filter 41f of FIG. 3b.

The two light sources 29 shown in FIG. 1 may, in a different embodiment of the inventive fluorescence microscope 3, be embodied as a fluorescence excitation light source 29f and a white-light source 29w in such an embodiment. The illumination filter 41 is replaced by a fluorescence filter 41f and a white-light filter 41w, wherein the filters are located between the corresponding light source 29f, 29w and the light combination device 35.

FIG. 4 shows a color wheel 117 schematically showing the colors 112 yellow, orange, red, purple, blue and green which are given in the color wheel 117 with their first letter. FIG. 4 furthermore shows three possible sets of complementary colors 119 indicated by the double-headed arrows. Yellow is the complementary color 115 of purple, orange is the complementary 115 of blue and red is the complementary color 115 of green. In turn, purple is also the complementary color 115 of yellow and so on.

The color wheel 117 of FIG. 4 only shows 3 of a multitude of sets of complementary colors 119, as any color 112 of the filter wheel 117 and the corresponding opposing color 112 represent a set of complementary colors 119.

REFERENCE NUMERALS 1 microscope
3 fluorescence microscope
5 body
6 operation mode switches
7 observation area
9 illumination device
10 illumination system
11 observation assembly
13 stereoscopic eyepiece
15 observation optics
17 object
19 fluorophore
20 fluorescence excitation spectrum
21 light
22 emission spectrum
23 fluorescence excitation wavelengths
23a fluorescence emission wavelengths
25 visible-light background illumination wavelengths
25a reflected visible light background illumination wavelengths
27 partial cut-out
27a first cut-out
27b second cut-out
29 light source
29f fluorescence excitation light source
29w white-light source
31 collector
33 optical element
33a optical lens
35 light combination device
37 bifurcated optical fiber
39 illumination optics
41 illumination filter
41a second illumination filler
41f fluorescence filter
41w white-light filter
43 detection
45 camera
47 image signal
49 image signal line
51 camera driver
53 second image signal line
55 circuit board
56 controller
57 image processor
59 fluorescence emission color identification module
61 fluorescence emission intensity detection module
63 background color identification module
65 background intensity detector module
67 comparator module
69 memory module
71 image evaluation signal
73 image evaluation line
75 light source controller
76 frequency generator module
77 light source control signal
79 light source controller line
83 transmission characteristic
87 axis of ordinates
88 transmissivity
89 axis of abscissa
91 wavelength
93 fluorescence excitation passband
95 background illumination passband
97 UV-band
99 violet spectral region
101 near infrared spectral region
103 block band
105 observation passband
107 fluorescence excitation passband transmissivity
109 background illumination passband transmissivity
111 local maximum
112 color
113 fluorescence emission
115 complementary color
117 color wheel
119 set of complementary colors

What is claimed is:

1. An illumination system (10) for a fluorescence microscope (3) for observation of an object (17) containing at least one fluorophore (19), comprising:

an illumination device (9), the illumination device (9) having an emission spectrum (22) which comprises fluorescence excitation wavelengths (23) of the at least one fluorophore (19) and visible-light background illumination wavelengths (25) which differ from the fluorescence excitation wavelengths (23), an illumination filter (41) for arrangement between the illumination device (9) and the object (17), the illumination filter (41) having at least one fluorescence excitation passband (93) which is limited to the fluorescence excitation wavelengths (23) and at least one background illumination passband (95) which comprises the visible-light background illumination wavelengths (25), wherein the transmissivity (88) of the fluorescence excitation passband (93) is larger than the transmissivity (88) of the background illumination passband (95) and wherein the width (92) of the fluorescence excitation passband (93) is smaller than the width (92) of the background illumination passband (95), and wherein the intensity of the visible-light background illumination wavelengths (25) has at least a local maximum (111) at a color (112) complementary to a color (112) of fluorescence emission wavelengths (23a) of the at least one fluorophore (19).

2. The illumination system (10) according to claim 1, wherein the illumination device (9) comprises a plurality of modes of operation, wherein, in each of the plurality of modes of operation, the ratio of the energy in the visible-light background illumination wavelengths (25) to the energy in the fluorescence excitation wavelengths (23) is different.

3. The illumination system (10) according to claim 1, wherein the illumination device (9) comprises a plurality of modes of operation, wherein, in each of the plurality of modes of operation, the distribution of energy across the visible-light background illumination wavelengths (25) is different.

4. The illumination system (10) according to claim 1, further comprising an image processor (57) and a light source controller (75), the image processor (57) being configured to determine a color (112) of at least part of the object (17) and wherein the light source controller (75) is adapted to change the emission spectrum (22) of the light source (29) depending on the determined color (112) of at least part of the object (17).

5. The illumination system according to claim 1, further comprising an intensity detector (61) for determining an intensity of a fluorescence emission (113) emitted from the at least one fluorophore (19) and for automatically adjusting an intensity of at least part of the visible-light background illumination wavelengths (25) depending on the determined intensity.

6. A microscope (1) comprising an illumination system (10) according to claim 1.

7. The illumination system (10) according to claim 1, wherein the illumination device (9) comprises at least two light sources (29) having different emission spectra (22).

8. The illumination system (10) according to claim 7, wherein the emission spectrum (22) of one of the at least two light sources (29) comprises the fluorescence excitation wavelengths (23) and the emission spectrum (22) of another one of the at least two light sources (29) comprises the visible-light background illumination wavelengths (25).

9. The illumination system (10) according to claim 7, wherein the fluorescence excitation wavelengths (23) of different fluorophores (19) are emitted by different light sources (29) of the at least two light sources (29).

10. The illumination system (10) according to claim 7, further comprising a controller (56) configured to adapt at least one of the emission spectrum (22) and the intensity of the at least two light sources (29) independently of one another.

11. A microscope method for illumination of an object (17) comprising at least one fluorophore (19), the method comprising the steps of:

illuminating the object (17) with fluorescence excitation wavelengths (23) in the fluorescence excitation spectrum (20) of the at least one fluorophore (19) and with visible-light background illumination wavelengths (25) different from the fluorescence excitation wavelengths (23); and attenuating the visible-light background illumination wavelengths (25) before the visible-light background illumination wavelengths (25) reach the object (17);

wherein the intensity of the visible-light background illumination wavelengths (25) has at least a local maximum (111) at a color (112) complementary to a color (112) of fluorescence emission wavelengths (23a) of the at least one fluorophore (19).

12. The microscope method according to claim 11, further comprising the step of automatically adjusting a distribution of energy across the visible-light background illumination wavelengths (25) depending on a fluorescence emission spectrum of the at least one fluorophore (19).

13. The microscope method according to claim 11, further comprising the step of automatically adjusting an intensity in the visible-light background illumination wavelengths (25) depending on an intensity of light emitted in the fluorescence emission spectrum of the at least one fluorophore (19).

14. The microscope method according to claim 11, further comprising the step of automatically adjusting an intensity in the visible-light background illumination wavelengths (25) depending on a color (112) of at least part of the object (17).

* * * * *